S. M. MOORE.
AUTOMOBILE SWING.
APPLICATION FILED AUG. 16, 1916.

1,218,443.

Patented Mar. 6, 1917.

UNITED STATES PATENT OFFICE.

SAMUEL M. MOORE, OF SUMNER, ILLINOIS.

AUTOMOBILE-SWING.

1,218,443.  Specification of Letters Patent.  Patented Mar. 6, 1917.

Application filed August 16, 1916. Serial No. 115,231.

*To all whom it may concern:*

Be it known that I, SAMUEL M. MOORE, a citizen of the United States, residing at Sumner, in the county of Lawrence and State of Illinois, have invented certain new and useful Improvements in Automobile-Swings; and I do hereby declare the following to be a full, clear, and exact description of the invention, such as will enable others skilled in the art to which is appertains to make and use the same.

This invention relates to new and useful improvements in an automobile swing and one of its objects is the provision of a device of this character, which shall be simple, durable and efficient, and which may be manufactured and sold at a comparatively low cost.

Another object of this invention is to provide a frame adapted to be supported in an inclined position, whereby an automobile may be driven thereon to elevate the front end of the automobile and upon further forward movement of the automobile, the frame will be moved to a substantially horizontal position elevating the rear end of the automobile.

A further object of this invention is to provide a supporting base, having rollers thereon for an engagement with the frame, whereby after the front end of the automobile is elevated and upon further movement of the automobile forwardly, the frame will slide forwardly upon the rollers of the supporting base until the frame moves to a horizontal position elevating the entire automobile.

A still further object of this invention is to provide supporting legs to each end of the frame adapted to support the frame when in a horizontal position to prevent same from swinging on the base when in an operative position.

With these and other objects in view as will become more apparent as the description proceeds, the invention consists in certain novel features of construction, combination and arrangement of parts as will be hereinafter more fully described and claimed.

For a complete understanding of my invention, reference is to be had to the following description and accompanying drawing, in which:—

Figure 1:
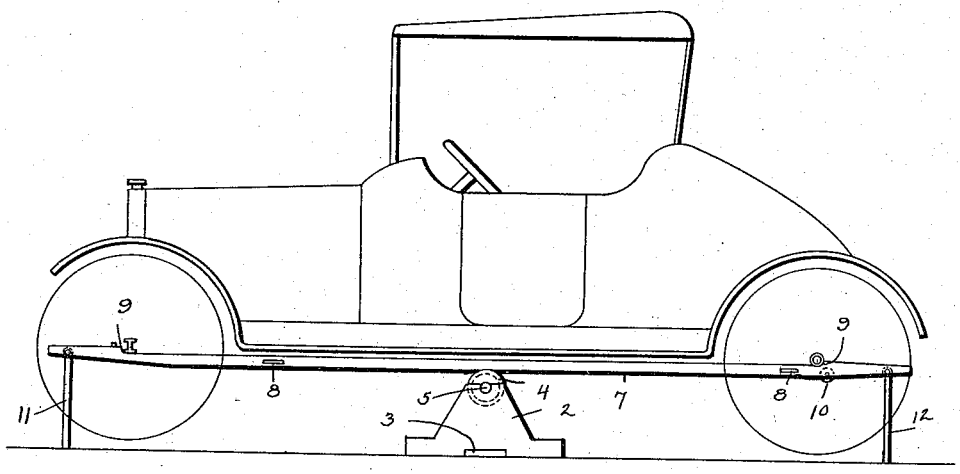
Figure 2:
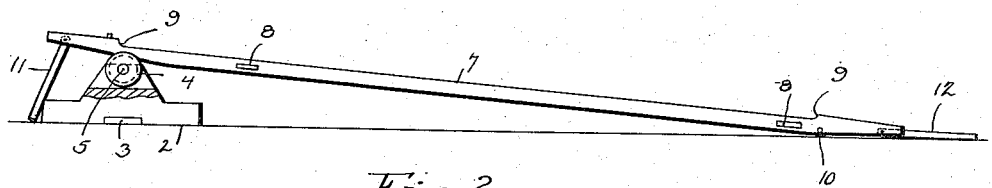
Figure 3:
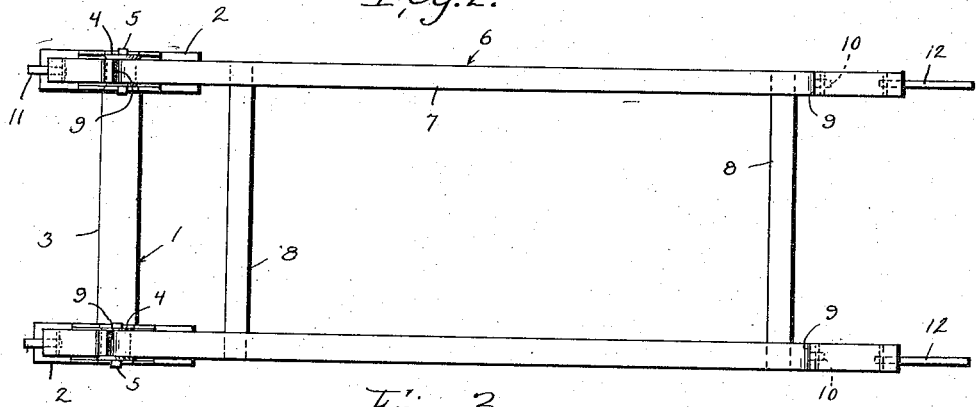

Figure 1 is a side elevation of an automobile swing, constructed in accordance with my invention, illustrating it in an operative position supporting an automobile, Fig. 2 is a side elevation partly in section of the same, illustrating it in an inoperative position, and Fig. 3 is a top plan view of the same.

Referring in detail to the drawing, the numeral 1 indicates as an entirety a supporting base, consisting of a pair of blocks 2, being connected together by a transverse bar 3. The blocks 2 have their upper ends bifurcated to receive rollers 4. The rollers 4 are journaled in the bifurcated ends of the blocks 2 by bolts 5.

A frame 6, consists of a pair of parallel members 7 being connected together by transversely extending bars 8 and each have shoulders 9 formed upon their upper faces and adjacent each end thereof, one end of the frame 6 normally rests upon the rollers 4 which are of the grooved nature to receive the members 7 and the opposite ends resting upon the ground as clearly illustrated in Fig. 2. Suitable rollers 10 are journaled to the end of the frame 6 which rests upon the ground, whereby the rollers 10 will ride upon the ground and support the frame from engagement therewith, when said frame is moved forwardly upon the base 1. The forward end of the frame 6 has secured thereto downwardly depending legs 11 which are moved away from an engagement with the ground when the frame 6 is in an inoperative position or a position as clearly illustrated in Fig. 2. A pair of legs 12 are pivotally secured to the rear end of the frame 6 and adapted to lie in a horizontal position with the frame when in an inoperative position.

In operation, when desiring to elevate an automobile, the automobile is driven upon the frame 6 until the front axle of the automobile engages the forward shoulder 9 of the frame 6, when in this position, the forward end of the automobile will be substantially elevated from an engagement with the ground. Upon further movement of the automobile under its own power, the rear wheels still being in engagement with the ground, cause the frame 6 to move forwardly upon the rollers 4 of the base 1 until the frame 6 moves to a substantially horizontal position or operative position as illustrated in Fig. 1, thus elevating the rear end of the automobile from an engagement with the ground. As the rear end of the frame 6 moves from an engagement with the ground, the rear legs 12 swing about their pivots and depend downwardly so as to support the rear end of the frame 6 when in an operative position. The front legs 11 support the forward end and coöperate with the rear legs 12 to prevent the frame 6 from rocking or swinging upon the base 1.

While I have shown and described the preferred embodiment of my invention, it will be understood that minor changes in construction, combination and arrangement of parts may be made without departing from the spirit and scope of the invention as claimed.

Having thus described my invention, what I claim is:—

1. A device of the character set forth comprising a pair of blocks, means for securing said blocks together, rollers journaled on said blocks, a frame mounted on said rollers and supported in an inclined position, shoulders formed on said frame and adapted to be engaged by an automobile when driven upon the frame to cause said frame to move forwardly upon the rollers, and means for supporting each end of the frame.

2. A device of the character set forth comprising a base, rollers journaled on said base, a pair of parallel members mounted on said rollers, transversely extending bars connecting said parallel members together, said parallel members having cut out portions adjacent each end thereof to form shoulders, said shoulders adapted to be engaged by an automobile to cause the parallel members to move forwardly upon the rollers to elevate the automobile, and means for supporting the ends of the parallel members.

3. A device of the character set forth comprising a base, a frame slidably mounted on said base, shoulders formed on said frame and adapted to be engaged by an automobile when driven upon the frame to cause said frame to move forwardly upon the base into a horizontal position to elevate the automobile, and legs secured to the forward end of the frame and in engagement with the ground when in a horizontal position, and legs pivotally secured to the rear end of the frame and adapted to move downwardly as the frame is elevated to a horizontal position to support the rear end of the frame.

In testimony whereof I affix my signature in presence of two witnesses.

SAMUEL M. MOORE.

Witnesses:
 JOHN H. ROBINSON,
 K. H. STOUT.

Copies of this patent may be obtained for five cents each, by addressing the "Commissioner of Patents, Washington, D. C."